(12) United States Patent
Lomes

(10) Patent No.: US 8,510,047 B2
(45) Date of Patent: Aug. 13, 2013

(54) METHOD AND SYSTEM FOR MONITORING AN UNDERGROUND ELECTRIC CABLE

(75) Inventor: Alexander Lomes, Maccabim (IL)

(73) Assignee: Elta Systems Ltd., Ashdod (IL)

( * ) Notice: Subject to any disclaimer, the term of this patent is extended or adjusted under 35 U.S.C. 154(b) by 849 days.

(21) Appl. No.: 11/964,641

(22) Filed: Dec. 26, 2007

(65) Prior Publication Data

US 2009/0167308 A1 Jul. 2, 2009

(51) Int. Cl.
*G06F 19/00* (2011.01)
*G01V 3/11* (2006.01)

(52) U.S. Cl.
USPC .............................................. 702/5; 324/326

(58) Field of Classification Search
USPC ..................... 702/5; 324/330, 331
See application file for complete search history.

(56) References Cited

U.S. PATENT DOCUMENTS

| | | | |
|---|---|---|---|
| 4,317,079 A | 2/1982 | Yamamura et al. | |
| 4,617,518 A | 10/1986 | Srnka | |
| 4,837,489 A * | 6/1989 | McFee ............................. | 324/67 |
| 5,006,806 A | 4/1991 | Rippingale et al. | |
| 5,576,973 A * | 11/1996 | Haddy ...................... | 342/357.06 |
| 5,650,725 A * | 7/1997 | Powell et al. .................. | 324/326 |
| 5,757,190 A | 5/1998 | Mercer | |
| 5,841,280 A | 11/1998 | Yu et al. | |
| 6,356,082 B1 | 3/2002 | Alkire et al. | |
| 2002/0184235 A1 | 12/2002 | Young et al. | |
| 2003/0222651 A1 | 12/2003 | Tabanou | |
| 2004/0004909 A1 * | 1/2004 | Fujimori ....................... | 368/204 |
| 2004/0059539 A1 * | 3/2004 | Otsuki et al. .................. | 702/150 |
| 2005/0062475 A1 * | 3/2005 | Nakanishi et al. ............. | 324/326 |
| 2005/0115337 A1 * | 6/2005 | Tarumi .......................... | 73/865.8 |
| 2005/0143910 A1 * | 6/2005 | Seki .................................. | 701/208 |
| 2005/0184847 A1 * | 8/2005 | Rosemann ..................... | 336/199 |
| 2005/0243010 A1 * | 11/2005 | Terry ............................. | 343/841 |
| 2007/0035304 A1 * | 2/2007 | Stolarczyk et al. ............ | 324/330 |

FOREIGN PATENT DOCUMENTS

| | | |
|---|---|---|
| DE | 19731560 A1 | 2/1999 |
| DE | 102005011264 A1 | 9/2006 |
| GB | 827843 | 2/1960 |
| WO | 96/23235 A1 | 8/1996 |
| WO | 9602325 A1 | 8/1996 |

OTHER PUBLICATIONS

Extended European Search Report dated Jan. 19, 2012 in 07025145.9-1240/1939651.

* cited by examiner

*Primary Examiner* — Bryan Bui
(74) *Attorney, Agent, or Firm* — Browdy and Neimark, PLLC

(57) ABSTRACT

In a method and system for monitoring an underground cable in a site of interest, multiple samples of magnetic field data and corresponding location data are collected periodically over a sampling period of extended time. The magnetic field data samples and corresponding location data are processed to determine respective topologies of one or more current-carrying conductors in the site and for each of the conductors respective magnetic field data relating to each sampled point are integrated with respect to a predetermined parameter of the respective conductor so as compute an integrated contribution of each sampled span along the respective conductor. The data relating to different conductors in the site are output in a manner that allows determination of a conductor for which the parameter changes during the sampling period.

28 Claims, 5 Drawing Sheets

METHOD AND SYSTEM FOR MONITORING AN UNDERGROUND ELECTRIC CABLE

FIELD OF THE INVENTION

This invention relates to detecting underground electric cables.

BACKGROUND OF THE INVENTION

The need to detect electric power cables buried underground frequently arises when excavations are required and there is the risk of damage to underground cables. Although in normal circumstances the location of buried cables is generally recorded, during maintenance work, for example, cables can be moved and therefore prior records may not always be reliable.

Electric cables are also required for feeding power to equipment during underground construction. As a result of this underground activity, an energized electrical cable must be available during the process of work and owing to the nature of the work is apt to vary in location and very possibly also in length. Such a cable generates an alternating magnetic field with frequencies, typically around 50 Hz or 60 Hz, according to the domestic power supply network to which the cable is connected and this magnetic field allows remote detection of the cable.

For example, U.S. Pat. No. 6,356,082 (Alkire et al.) issued Mar. 12, 2002 discloses a radio link established between a portable receiver used by an operator to trace the underground portion of a utility and a transmitter which induces a magnetic signal in the utility. Circuitry in both transmitter and receiver allows the operator who is remote from the transmitter to interrogate the transmitter from the receiver for essential information and to control operating functions at the transmitter.

U.S. Pat. No. 5,006,806 (Osman et al.) issued Apr. 9, 1991 discloses methods and apparatus employing permanent magnets for marking, locating, tracing and identifying hidden objects such as buried fiber optic cables. The objects are provided with elongated permanent magnet identifier devices having magnetic fields that may be detected at a distance from the objects.

It is also known to employ airborne apparatus for cable detection. For example, WO 96/23235 (Mulder et al.) published Aug. 1, 1996 uses an antenna for inducing a signal from a power line magnetic field, pre-amplified, passed through a low pass filter and gain stage contained within a servo loop to remove DC offset, and amplified in two channels providing voltage gains of unity and 256. A dual channel, 22 bit sigma-delta converter digitizes the high and low gain signals and outputs directly to a digital signal processor, which selects between default high gain and low gain signals, high gain buffer overflow causing the switch. Samples are scaled, windowed and passed to a Fast Fourier Transform (FFT) module to yield solutions which represent the magnitude and phase of the signal, which are processed to discard frequencies outside the power line frequency +/−10 Hz. The remaining solutions are passed to an estimator, wherein the magnitude squared of each FFT bin is calculated and stored in an estimate buffer, which holds the last 8 such results. Signal estimation is provided by averaging the last n values for n=1 to 8 in the PSD estimate buffer, the estimates S(1) to S(8) being used in the wire decision processing. Noise estimation is made wherein the average PSD estimate is used to estimate the noise. The current threshold is updated when the S(8) value is below the current threshold minus a predetermined amount. If S(1) exceeds the current threshold multiplied by the margin for the current sensitivity setting, then a wire is considered to have been detected.

The apparatus described in WO 96/23235 can be applied to the detection of current-carrying underground cables but is suited only for the detection of an isolated electrical wire and not for the detection of current-carrying underground cables owing to possible presence of other buried cables in close proximity. In the case of detection of isolated electrical wires the problem can be presented as a general problem of detection of noise. In the case of detection of underground buried electrical cables the problem is much more complicated owing to the possible presence of other buried cables in close proximity. Consequently, the airborne monitoring of underground activities is characterized by a relatively high level of interference picked up by magnetic sensor from on-ground distributed domestic power networks. In this case the problem of signal-to-interference ratio is more significant than signal-to-noise ratio for efficient detection of buried cable. No solution to this problem appears to have been proposed in the art.

SUMMARY OF THE INVENTION

The present invention provides a cable detection system and method which allows discrimination of an underground cable whose length changes during an extended measurement period.

According to a first aspect of the invention there is provided a method for monitoring an underground cable, the method including:
  obtaining multiple samples of magnetic field data and corresponding location data collected periodically over a sampling period of extended time,
  processing said magnetic field data samples to determine respective topologies of one or more current-carrying conductors in said site;
  integrating for each of said conductors respective magnetic field data relating to each sampled point with respect to a predetermined parameter of the respective conductor so as compute an integrated contribution of each sampled span along the respective conductor; and
  outputting data relating to different conductors in said site in a manner that allows determination of a conductor for which said parameter changes during the sampling period.

According to a second aspect of the invention there is provided a cable detection apparatus including:
  a topology determination unit responsive to multiple samples of magnetic field data and corresponding location data collected periodically over a sampling period of extended time by scanning a site, said topology determination unit being configured to process said magnetic field data samples to determine respective topologies of one or more current-carrying conductors in said site;
  an integrator coupled to the topology determination unit and being configured to integrate for each of said conductors respective magnetic field data relating to each sampled point with respect to a predetermined parameter of the respective conductor so as to compute an integrated contribution of each sampled span along the respective conductor; and
  an output device coupled to the integrator for outputting data relating to different conductors in said site in a manner that allows determination of a conductor for which said parameter changes during the sampling period.

According to a third aspect of the invention there is provided a cable detection system, including:

a data collection unit for obtaining multiple samples of magnetic field data and corresponding location data periodically over a sampling period of extended time;

a topology determination unit responsive to the multiple samples of magnetic field data and corresponding location data collected periodically over a sampling period of extended time by scanning a site, said topology determination unit being configured to process said magnetic field data samples to determine respective topologies of one or more current-carrying conductors in said site;

an integrator coupled to the topology determination unit and being configured to integrate for each of said conductors respective magnetic field data relating to each sampled point with respect to a predetermined parameter of the respective conductor so as to compute an integrated contribution of each sampled span along the respective conductor, and an output device coupled to the integrator for outputting data relating to different conductors in said site in a manner that allows determination of a conductor for which said parameter changes during the sampling period.

In one embodiment of the predetermined parameter is a length of the cable, so as to allow determination of a conductor whose length changes during the sampling period. Such an application is particularly useful for monitoring and control of underground earthworks during construction, since an electrical cable of varying length and/or location may be indicative or suggestive of provision of electric power to apparatus whose location changes over time.

Such an application may also be useful for monitoring and control of waterways by attaching an electrical cable to a float that is allowed to float on water flowing through the waterway.

Another possible application is for monitoring and controlling progress of robot by monitoring changes in location and possibly length of a cable that feeds electrical power thereto.

In one embodiment of such a cable detection system, the data collection unit is disposed in an aerial reconnaissance unit, such as a UAV and the data processing unit is disposed in a ground unit.

BRIEF DESCRIPTION OF THE DRAWINGS

In order to understand the invention and to see how it may be carried out in practice, an embodiment will now be described, by way of non-limiting example only with regard to detection of an electric cable of variable length and with reference to the accompanying drawings, in which.

DETAILED DESCRIPTION OF EMBODIMENTS

Hardware Description

Figure 1A:
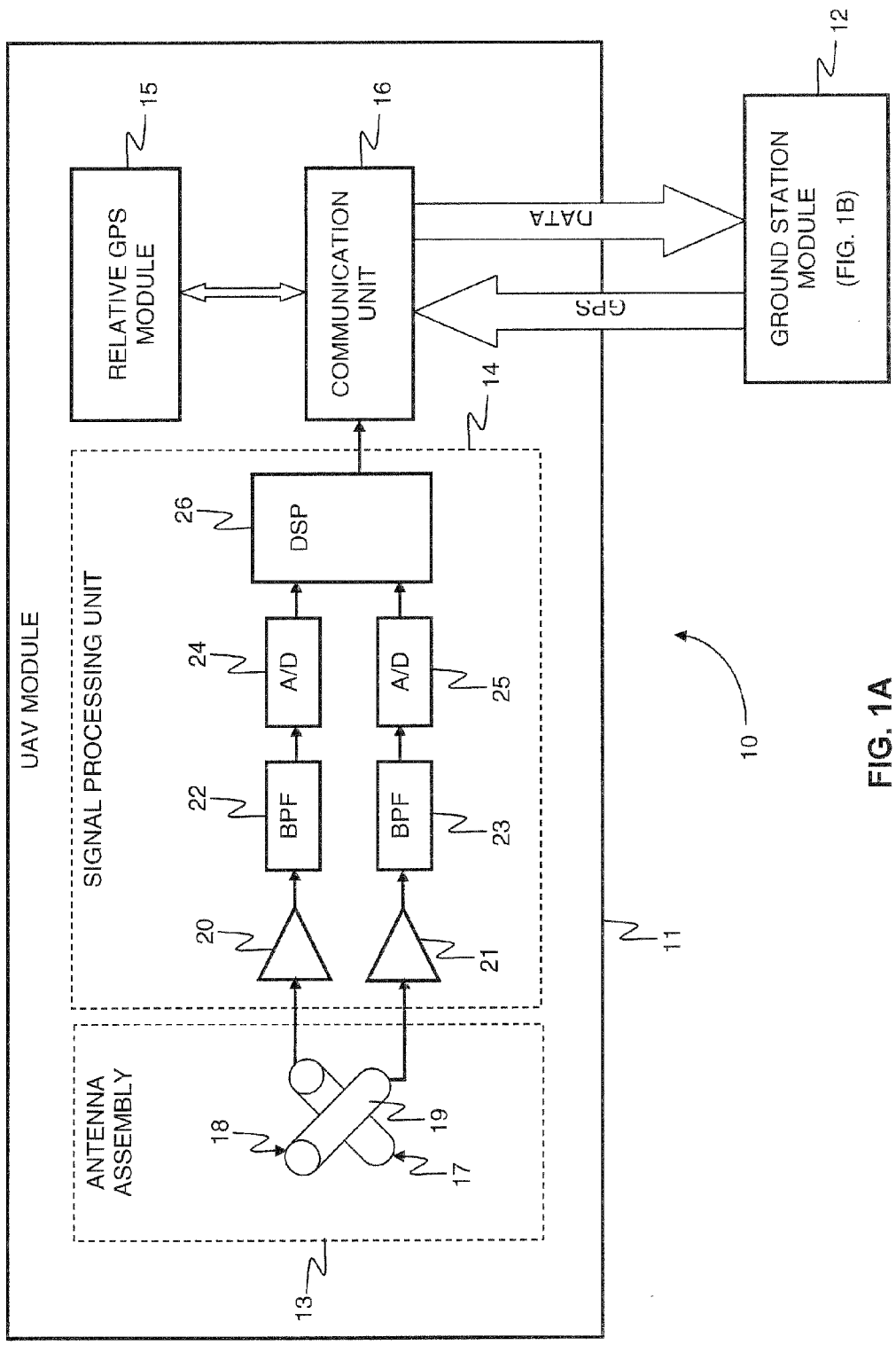
FIG. 1A is a block diagram showing functionality of a system having a UAV module and a ground station module according to an embodiment of the invention.
Figure 1B:
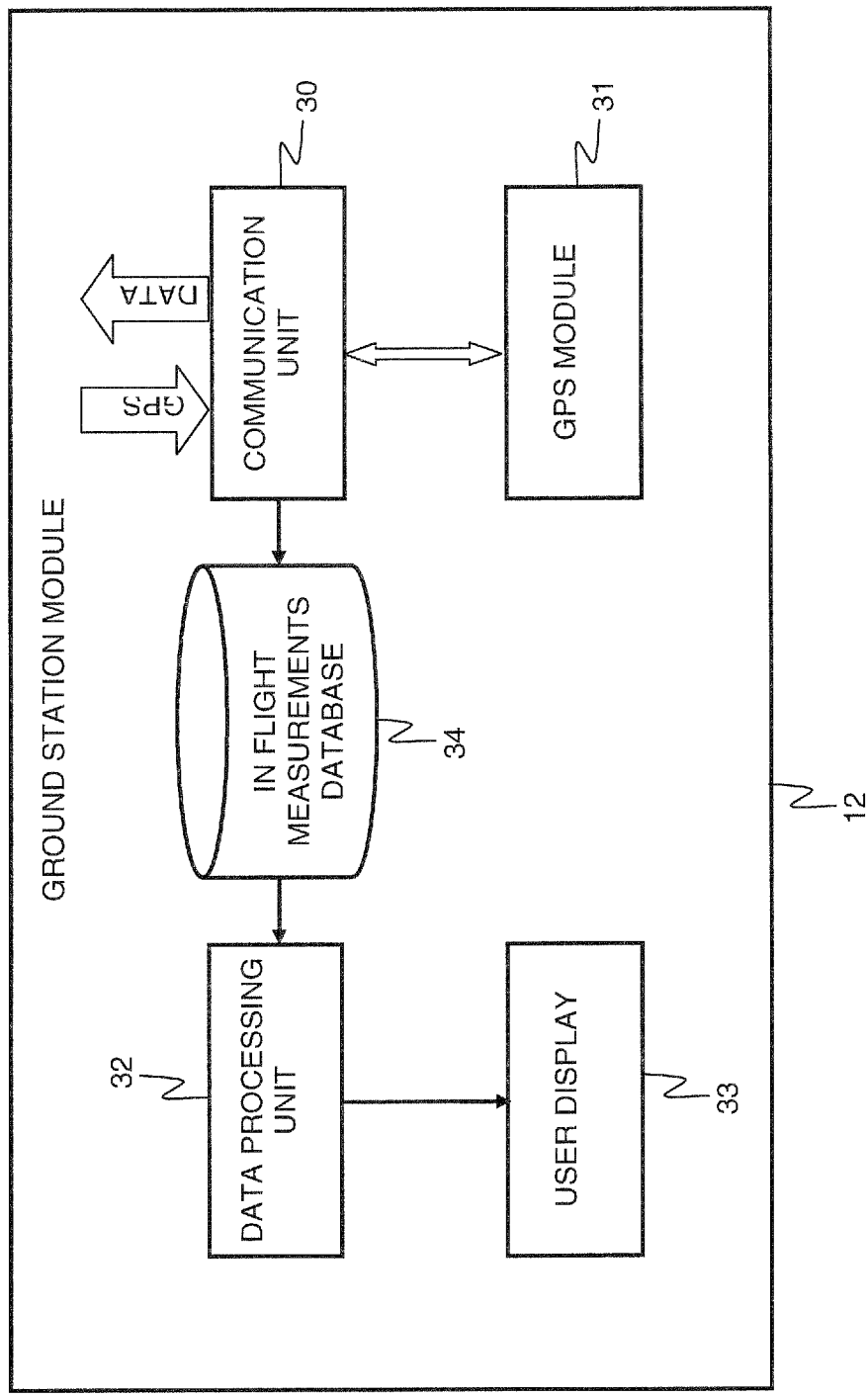
FIG. 1B is a block diagram showing detailed functionality of the ground station module shown in FIG. 1A.

FIG. 1A shows functionality of a system 10 for detecting buried electric cables. The system 10 comprises an unmanned aircraft vehicle (UAV) module 11 and a ground station module 12 shown in detail in FIG. 1B and described below. The UAV module 11 constitutes an aerial reconnaissance unit (also referred to as a data collection unit) and includes an antenna assembly 13, a signal processing unit 14, a relative GPS module 15 and a communication unit 16. Standard GPS is based on receiving signals from some set of visible satellites at a single point of measurement. It provides limited accuracy. Relative GPS is based on reception at two points in space, which are able to receive the same set of satellites. One of the points is a static, geographically well-defined station that serves as a reference point. This station relays the signals received from satellites together with its own coordinates to the relative GPS module 15 within the UAV module 11. The relative GPS module 15 receives satellite information from the two points in space together with the position data of the reference point. This system provides much more accuracy than the standard GPS.

The antenna assembly 13 includes a pair of loop antennae 17 and 18 disposed in mutual orthogonal spatial relationship in a horizontal plane. In one embodiment, each antenna was formed of 10,000 turns of permalloy contained within a brass shielding tube 19 so as to shield the antenna from the electrical field component. Magnetic eddy currents circulating in the brass tube are minimized by a longitudinal slot cut in the brass shielding tube 19. The antennae 17 and 18 are connected to respective low noise amplifiers 20 and 21 that buffer the very small voltages induced in the antennae. Respective band-pass filters 22 and 23 are connected to the outputs of the low noise amplifiers 20 and 21 to remove unwanted DC components of the strong earth magnetic field and high frequency components of the signal to prevent aliasing and to more effectively utilize the dynamic range of respective A/D converters 24 and 25 within the signal processing unit 14 that are coupled to the outputs of the band-pass filters 22 and 23 for digitizing their respective analog signals prior to digital signal processing.

The antenna assembly 13 in combination with the signal processing unit 14 constitutes a magnetometer. The antennae 17 and 18 generate two signals reflecting orthogonal components of the magnetic field. The signal processing unit 14 includes the A/D converters 24 and 25 whose digital outputs are coupled to a digital signal processor 26, which processes the antenna signals in a manner described in greater detail below. The communication unit 16 is coupled to an output of the digital signal processor 26 for effecting bi-directional data communication with the ground station module 12 and for effecting bi-directional communication with the relative GPS module 15.

The A/D converters 24 and 25 sample and digitize N-samples of the signals from the antenna assembly 13, preparing a single burst of magnetic field measurement for further digital signal processing. The sampling rate, number of samples and inter-burst interval reflect the required space grid of the magnetic field sampling and depend on UAV altitude and velocity. For example, assuming a UAV velocity about 50 m/sec, 1000 samples at a sampling rate of 5 KHz provide a measurement grid of 10 m during continuous sampling of the field. The burst time is 0.2 Sec. A grid of 10 m requires that the accuracy of UAV location estimation be within about 1 m, which is much beyond the performance of the standard GPS, but is well within the capability of Relative GPS. The digital signal processor 26 performs, generally, cross-spectrum calculation by using an FFT algorithm. In this case, the signal from the antenna 17 is used as a real part and the signal from the antenna 18 as an imaginary part. The region of the spectrum (frequencies) in the vicinity of 50 Hz (60 Hz) is selected. The absolute value of the result reflects amplitude of the magnetic field. The maximum of the absolute value of the selected region is measured. The phase corresponding to the maximum reflects orientation of the vector combination of currents producing magnetic field relative to the two antennas 17 and 18. Results of the burst processing including frequency, amplitude and phase of the maximum signal together with the time of measurement are conveyed as a field measurement report by the UAV module 11 to the ground station module 12 via the respective communication units.

The UAV communication unit 16 combines burst reports of magnetic field measurements together with the relative GPS information of the UAV and transmits it to the ground station module 12.

The ground station module 12 comprises a data communication unit 30 that is coupled to the communication unit 16 of the UAV module 11 for receiving data therefrom. The data communication unit 30 is also coupled to a GPS module 31 for obtaining accurate geographical location data of the ground station module 12, which are conveyed to the communication unit 16 of the UAV module 11. The spatial location of the UAV module 11 relative to the ground station module 12 is known thus allowing the relative GPS module 15 to compute the geographical location of the UAV required for precise allocation of magnetic field measurements. If the ground station is close to the monitored area, the relative GPS module 15 in the UAV receives GPS signals from the same set of GPS satellites as the ground station. The ground station relays the appropriate GPS information to the UAV module 11 allowing the relative GPS 15 to compute attitudes and position on-board the UAV. The ground station module 12 further comprises a data processing unit 32 and a user display unit 33.

The ground station communication unit 30 receives the magnetic field measurements from the UAV module and for each burst stores data relating to field amplitude, phase, UAV location, UAV attitudes and time of measurement in a database 34 according to the flight ID. The database 34 serves as an input for the data processing unit 32. The data processing unit 32 may be realized as a computer program in a ground station computer and serves as a topology determination unit for determining respective topologies of one or more current-carrying conductors in the monitored site. The data processing unit 32 also serves to integrate for each of the conductors, respective magnetic field data relating to each sampled point with respect to a predetermined parameter of the respective conductor so as to compute an integrated contribution of each sampled span along the respective conductor. The results of data processing are arranged as a 3D vector map and conveyed to the user display unit 33. In some embodiments the data processing unit 32 is configured for graphically formatting a respective topology of each conductor and indicating in association with each conductor whether a monitored parameter changes during the sampling period.

Figure 2:
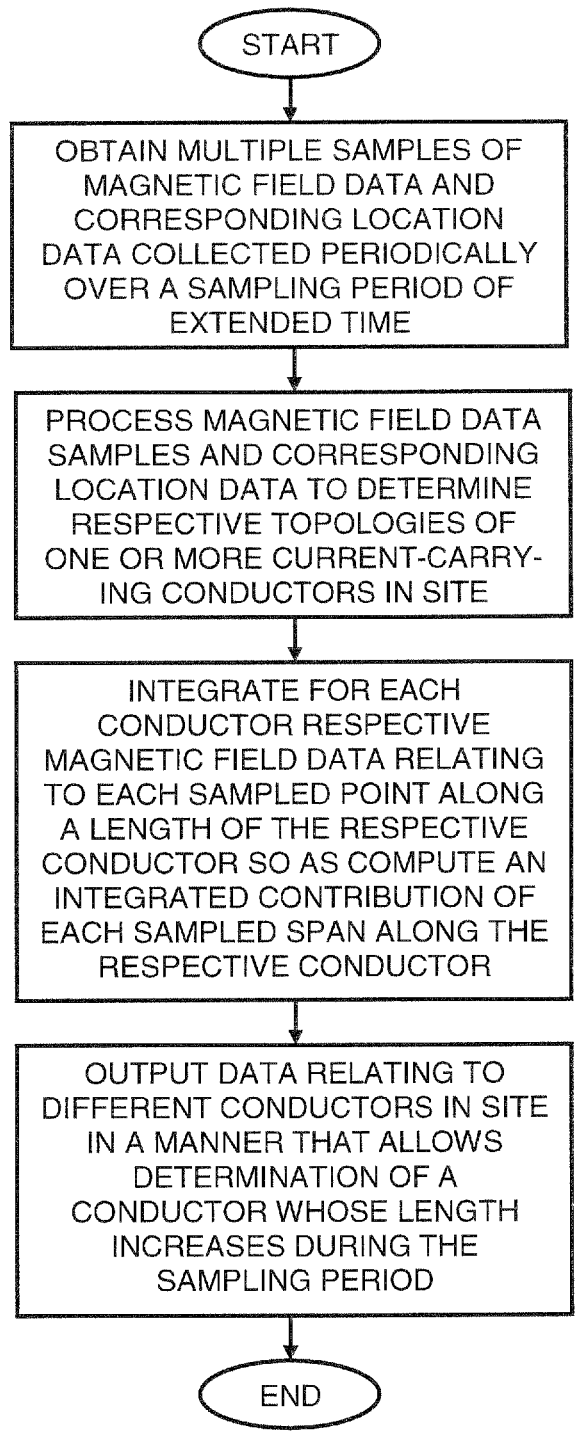
FIG. 2 is a flow diagram showing the principal operations carried out by the system according to an overall concept of the invention.

FIG. 2 is a flow diagram depicting the principal operations performed by a method for monitoring underground activity by repeated magnetic field measurement analysis according to an overall concept of the invention.

Multiple samples of magnetic field data and corresponding location data are collected periodically over a sampling period of extended time. Typically, this is done by flying over the suspected site periodically and taking magnetic field measurements of selected locations whose spatial coordinates are determined using the relative GPS module 15 so as store magnetic field measurements and associated locations in space.

The magnetic field data samples are processed to determine respective topologies of one or more current-carrying conductors in the site; and for each conductor the respective magnetic field data relating to each sampled point along a length of the respective conductor is integrated so as compute an integrated contribution of each sampled span along the respective conductor. Data relating to different conductors in the site is then output in a manner that allows determination of a conductor whose length increases during the sampling period. For example, the topology of each conductor can be represented as a series of segments, which are color-coded according to the magnetic field of a respective span of a respective conductor sampled at the respective sampling period. By such means, a conductor span of constant length is represented as a multi-segment line of constant color and a conductor of increasing length is represented as a multi-segment line whose segments are of different colors.

Figure 3:
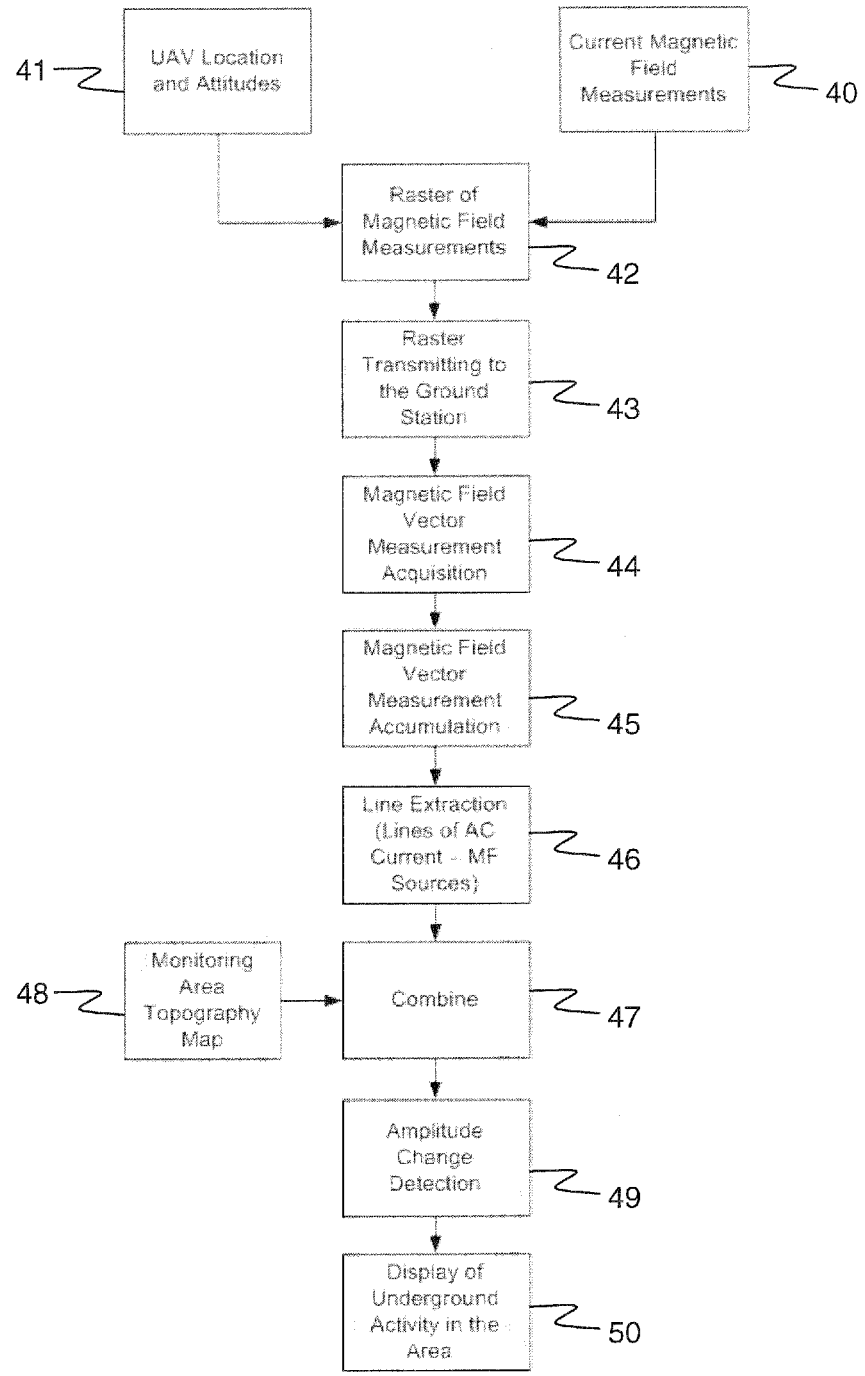
FIG. 3 is a flow diagram showing the principal operations carried out by the system according to an embodiment of the invention.

FIG. 3 is a flow diagram depicting the principal operations performed by the system 10 for monitoring underground activity by repeated magnetic field measurement analysis according to a particular embodiment of the invention.

Successive measurements are made throughout an extended measurement period by flying above monitoring area at a constant altitude, during which the UAV performs a sequence of magnetic field measurements (40). These measurements are combined with the concurrent data of UAV location and attitude estimation (41), which is interpreted as raster sampling of the magnetic field (42). This data is transmitted to the ground station (43) for the registration of magnetic field vectors (44) in a database relative to some fixed geographic point, which is assumed to be the reference point for all sequence of measurements. The process of measurement acquisition is required for further process of vector accumulation (45) of repeating raster measurements of the magnetic field by UAV. After a desired number of the accumulations, which can be estimated on the basis of the value of required rate of underground activity advance, the accumulated raster of magnetic field measurements is processed by a line extraction algorithm (46). The algorithm can be realized by well-known approaches, for example by applying the Laplacian to the raster pixels. The lines, extracted from the accumulated raster, indicate the AC current sources of the measured magnetic field. The extracted line picture is combined (47) with the topography map of the monitored area (48), thus presenting the map of AC current sources of magnetic field measurements, which is accumulated during the measurement period. Those fixed power lines that have constant topology are energized constantly (possibly with different intensities) and their accumulated magnetic field distribution pattern appears as lines with constant amplitude distribution of magnetic field. In contrast to those power lines that are invariant throughout the measurement period, lines whose lengths increase throughout the measurement period, and whose current thus increases, are represented by a different pattern of magnetic field distribution, whose accumulated magnetic field amplitude varies from one measurement (i.e. flight) to another. These changes in amplitude can be detected by a suitable algorithm (49) known per se, for example the gradient calculation algorithm. Lines with the changing amplitude distribution are presented on the display showing underground activity (50) together with the reference topographic map of the monitoring area.

Operation

The operation of the system 10 is initiated by preparing the flight plan for UAV auto-pilot system. The monitoring area is selected on a geographical map and the UAV trajectory is defined as a raster curve covering the area at a predetermined resolution. Flight parameters such as altitude and velocity are then defined. The parameters of magnetic field sampling are calculated after definition of the UAV flight plan. The ground station is located in some reasonable proximity to the monitoring area to provide assured communication with the UAV via the communication unit 30 and to make it possible to receive the same set of GPS satellites. Repeated flights are conducted above the monitoring area according to an estimated schedule of the underground activity.

When the UAV reaches the initial point of the monitoring area it starts to send magnetic field measurement data to the ground station data processing unit 32. Each measurement represents the vector sum of all magnetic field sources in the area. The magnetic field measured by UAV antenna assembly 13 is highly dependent on the length of the electric cable relative to the distance of measurement and orientation of the cable in the space relative to the antenna location. Thus, when the cable length is much more than the distance to the antenna the inverse square law of the magnetic field strength is applicable, i.e.;

$$B \propto 1/R^2$$

If the length of the magnetic source is small relative to the distance of measurement, the field changes according to $1/R^3$. The field also changes according to the cosine of the angle between normal to the cable of source and direction to the antenna. Additionally, different domestic power supply networks residing within the monitored area can receive electrical energy from the different power stations (or from different power hubs) which can operate at slightly different AC frequencies. All these properties of the nature of the magnetic field measured by the system for monitoring of underground activity are used to ensure reliable detection of an AC current-carrying cable whose length increases over a period of time. It is assumed that during a single flight, the frequencies of the different networks in the area do not change significantly. In this sense, the different magnetic field frequencies measured by the UAV in a single flight are assumed to belong to the different networks and can be separated easily.

Figure 4:
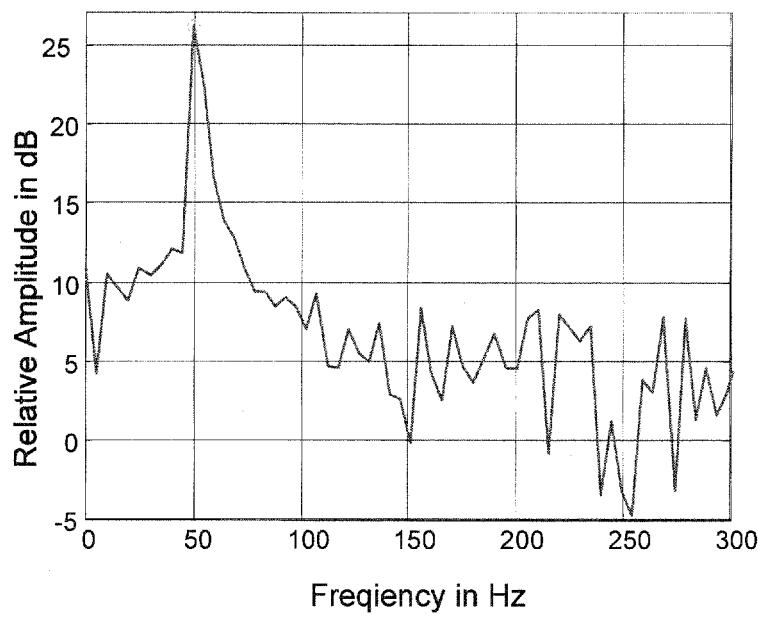
FIG. 4 is a graphical representation showing a spectrum of the measured magnetic field of the 50 Hz source current at a single point of a buried cable.

FIG. 4 is a graphical representation showing a spectrum of the measured magnetic field of the 50 Hz source current at a single point of a buried cable. It will be appreciated that the frequency of the local AC supply (typically 50 or 60 HZ) is known and it is seen from FIG. 4 that the peak amplitude for a 50 Hz supply occurs when the frequency is 50 Hz. Only this peak value is of interest and it is this value which is correlated with the known location in space of the present field sample as determined by the Relative GPS module 15 in the UAV module 11 and stored in the database 34. The remainder of the graph represents noise and is ignored.

The results of on-line measurements of each flight are stored in the database 34 in an image format whose pixel coordinates correspond to the chosen grid of UAV locations during the magnetic field measurements. Each pixel is associated with stored frequency, amplitude and a phase of magnetic field as well as UAV attitudes. The first transformation of this image is to define the direction of the AC currents by rotating the phases of the pixel according to the UAV attitudes. The result is an image containing vector values of the currents in each its pixel.

The images from different flights combine as a vector sum for each pixel. Small differences between real pixel locations in different flights are negligible relative to the UAV flight altitude. The result of image accumulation after a predetermined number of flights is converted to the geographical coordinate system and is presented to the user as a 3D picture superimposed on the digital terrain map.

Figure 5:
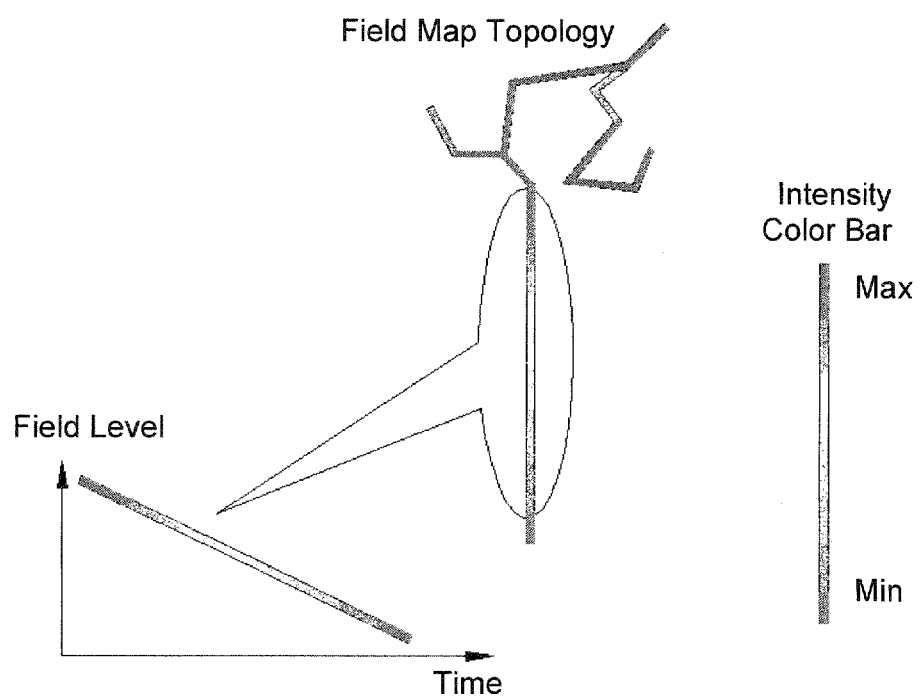
FIG. 5 is a graphical representation of a field map output by the system allowing visual discrimination of a conductor whose length changes during the sampling period.

FIG. 5 is a graphical representation of a field map output by the system allowing visual discrimination of a conductor whose length increases during the sampling period. The figure represents an example showing topology of the area after a number of UAV flights and integration of the measurement results. As can be seen, the fixed-length lines have some constant intensity that is encoded by color. The line of variable (increasing) length has a changing intensity. Owing to continuity of the current, which flows equally in the "older" portions of the line and also through the "newer" portions that were added since a previous measurement (i.e. flight), the "older" portions of the line are integrated more than the "newer" portions. This can be illustrated pictorially by a suitable reducing function of time.

For example, FIG. 5 shows the magnetic field amplitude encoded as a color. In this case the increasing length of AC current-carrying cable of the power supply for the growing underground construction will appear on the display as a straight line having a steadily changing color over time as distinct from stationary networks which are presented as lines of constant color. The rate of change can be estimated as a gradient of to color changes with time along the respective line.

It will be appreciated that while an embodiment of the invention has been described with regard to detection of a cable of increasing length, this is by way of example only. More generally, the principles of the invention may be applied to detect an electric cable for which an associated parameter changes during the sampling period. The change can be an increase as described but can equally well a steady decrease. In the specific case that the associated parameter is the length of the cable, the magnetic field data relating to each sampled point of the conductor is integrated with respect to the length of the conductor. However, more generally the magnetic field data relating to each sampled point of the conductor may be integrated with respect to a predetermined parameter so as compute an integrated contribution of each sampled span along the conductor as a function of the predetermined parameter.

It will also be appreciated that the invention in its most general form allows determination and analysis of an electromagnetic field associated with electrical current flowing through a cable and to infer therefrom movement of the cable over an extended period. While such movement has been described with particular regard to changes in length and/or location of the cable, it is to be understood that the invention also allows detection of connection and disconnection of the cable to a source of electrical power.

It will also be appreciated that many details have been described by way of non-limiting example only and are easily amenable to alteration. For example, while it is necessary to scan the area containing the buried cable this need not be done using a UAV and can obviously be done by helicopter or other platform. Indeed, in the case of cables that span a more limited area it may be possible to use cranes or other mechanical scanning fixtures. Likewise, although the electrical grid typically operates at 50 or 60 Hz, it is clear that the invention is not limited to the frequency of the AC power supplied to the cable.

It will also be understood that the cable detection apparatus according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method for monitoring progress of underground earthworks using equipment which requires an energized electrical cable to be available during the process of underground earthworks construction, the method comprising:
   detection of underground electrical cables by obtaining and processing samples of magnetic field data and corresponding location data; and
   discrimination of progress of underground earthworks in accordance with a length change of at least one of said underground cables whose length changes during a measurement period in a manner suggestive of provision of electric power to equipment whose location changes over time, indicating that said equipment which requires an energized electrical cable to be available is changing, in location, over time.

2. A method according to claim 1 wherein at least one of said detecting and said discriminating includes:
   obtaining multiple samples of magnetic field data and corresponding location data collected over a sampling period of extended time,
   processing said magnetic field data samples and corresponding location data to determine respective topologies of one or more current-carrying conductors in a site;
   integrating for each of said conductors respective magnetic field data relating to each sampled point with respect to a predetermined parameter of the respective conductor so as compute an integrated contribution of each sampled span along the respective conductor; and
   outputting data relating to different conductors in said site in a manner that allows determination of a conductor for which said parameter changes during the sampling period,
   wherein said predetermined parameter is a length of the cable.

3. The method according to claim 2, wherein obtaining multiple samples of magnetic field data and corresponding location data includes flying above said site and collecting multiple samplings throughout the sampling period.

4. The method according to claim 3, including using an unmanned aircraft vehicle (UAV) to collect said samples.

5. The method according to claim 2, wherein outputting data includes graphically formatting a respective topology of each conductor and indicating in association with each conductor whether said parameter changes during the sampling period.

6. The method according to claim 5, including graphically formatting a respective field map for each conductor so as to show the respective topology of each conductor and indicating in association with different conductors their respective fields measured at different sampling periods.

7. The method according to claim 6, including color-coding segments in said topology according to the magnetic field of a respective span of a respective conductor sampled at the respective sampling period whereby a conductor span for which said parameter is constant is represented as a multi-segment line of constant color and a conductor for which said parameter changes is represented as a multi-segment line whose segments are of different colors.

8. The method according to claim 2, including estimating rate of growth or decrease of a conductor of varying length as a gradient of color changes with time along a respective line corresponding to the conductor.

9. The method according to claim 2, wherein said predetermined parameter is connection or disconnection of the cable to a source of electrical power.

10. A non-transitory computer readable medium, tangibly embodying a program of instructions executable by the machine to perform a method according to claim 1.

11. A method according to claim 1 wherein said discrimination comprises discrimination of an increase in length of at least one underground cable in a manner suggesting progress of said underground earthworks.

12. A system for monitoring progress of underground earthworks using equipment which requires an energized electrical cable to be available during the process of underground earthworks construction, the system comprising:
   an electric cable detector operative for detection of underground electrical cables; and
   an underground earthworks progress discriminator operative for discrimination of progress of underground earthworks in accordance with a length change of at least one underground cable whose length changes during a measurement period in a manner suggestive of provision of electric power to equipment whose location changes over time, indicating that said equipment which requires an energized electrical cable to be available is changing, in location, over time.

13. The system according to claim 12, at least one of said electric cable detector operative for detection of underground electrical cables; and said underground earthworks progress discriminator including:
   a topology determination unit responsive to multiple samples of magnetic field data and corresponding location data collected over a sampling period of extended time by scanning a site, said topology determination unit being configured to process said magnetic field data samples to determine respective topologies of one or more currentcarrying conductors in said site;
   an integrator coupled to the topology determination unit and being configured to integrate for each of said conductors respective magnetic field data relating to each sampled point with respect to a predetermined parameter of the respective conductor so as to compute an integrated contribution of each sampled span along the respective conductor; and
   an output device coupled to the integrator for outputting data relating to different conductors in said site in a manner that allows determination of a conductor for which said parameter changes during the sampling period,
   wherein said predetermined parameter is a length of the cable.

14. The system according to claim 13, wherein the output device is coupled to a graphic formatting unit for formatting a respective topology of each conductor and indicating in association with each conductor whether said parameter changes during the sampling period.

15. The system according to claim 14, wherein the graphic formatting unit is adapted to format a respective field map for each conductor so as to show the respective topology of each conductor and indicating in association with different conductors their respective fields measured at different sampling periods.

16. The system according to claim 15, wherein the graphic formatting unit is adapted to color-code segments in said topology according to the magnetic field of a respective span of a respective conductor sampled at the respective sampling period whereby a conductor span for which said parameter is constant is represented as a multi-segment line of constant color and a conductor for which said parameter changes is represented as a multi-segment line whose segments are of different colors.

17. The system according to claim 13, said system further including:
a data collection unit for obtaining multiple samples of magnetic field data and corresponding location data over a sampling period of extended time.

18. The system according to claim 17, wherein the data collection unit includes:
a magnetometer,
a relative GPS module for receiving respective first and second signals from first and second sets of satellites together with respective first and second signals received from said first and second sets of satellites by a static, geographically well-defined reference point and further for receiving position data of the reference point;
a communication unit coupled to the magnetometer and the relative GPS module for relaying magnetic field data and associated position data of a scanned area to a data processing unit.

19. The system according to claim 18, wherein the magnetometer includes:
an antenna assembly, and
a signal processing unit for processing respective signals received by the antenna assembly.

20. The system according to claim 17, wherein the data collection unit is disposed in an aerial reconnaissance unit and the data processing unit is disposed in a ground unit.

21. The system according to claim 17, wherein the antenna assembly includes a pair of loop antennae and disposed in mutual orthogonal spatial relationship in a horizontal plane.

22. The system according to claim 21, wherein each loop antenna is formed of a plurality of turns of permalloy contained within a brass shielding tube so as to shield the antenna from an electrical field component.

23. The system according to claim 22, wherein a longitudinal slot is formed in the brass shielding tube to reduce magnetic eddy currents circulating in the brass shielding tube.

24. The system according to claim 21, further including:
respective low noise amplifiers connected to antennae within the antennae assembly for buffering voltages induced in the antennae;
a pair of band-pass filters each connected to a respective output of the low noise amplifiers for removing unwanted DC components of the earth magnetic field and high frequency components of sample from among the multiple samples of magnetic field data; and
a pair of A/D converters each coupled to a respective output of the band-pass filters for digitizing their respective analog signals prior to digital signal processing.

25. The system according to claim 17, wherein the output device is coupled to a graphic formatting unit for formatting a respective topology of each conductor and indicating in association with each conductor whether said parameter changes during the sampling period.

26. The system according to claim 25, wherein the graphic formatting unit is adapted to format a respective field map for each conductor so as to show the respective topology of each conductor and indicating in association with different conductors their respective fields measured at different sampling periods.

27. The system according to claim 26, wherein the graphic formatting unit is adapted to color-code segments in said topology according to the magnetic field of a respective span of a respective conductor sampled at the respective sampling period whereby a conductor span for which said parameter is constant is represented as a multi-segment line of constant color and a conductor for which said parameter changes is represented as a multi-segment line whose segments are of different colors.

28. A system according to claim 12 wherein said discrimination comprises discrimination of an increase in length of at least one underground cable in a manner suggesting progress of said underground earthworks.

* * * * *

UNITED STATES PATENT AND TRADEMARK OFFICE
CERTIFICATE OF CORRECTION

PATENT NO. : 8,510,047 B2  Page 1 of 1
APPLICATION NO. : 11/964641
DATED : August 13, 2013
INVENTOR(S) : Lomes It is certified that error appears in the above-identified patent and that said Letters Patent is hereby corrected as shown below:

Title Page, after Item (22) insert

--(30)   Foreign Application Priority Data

December 26, 2006   (IL).................. 180334.--

Signed and Sealed this
Tenth Day of December, 2013

Margaret A. Focarino
*Commissioner for Patents of the United States Patent and Trademark Office*